United States Patent [19]
Herrington

[11] 3,806,138
[45] Apr. 23, 1974

[54] SEALING RING

[75] Inventor: Maurice Gerald Herrington, Silver Beeches Colinswood Rd., Farnham Common, England

[73] Assignee: Engineering Components Limited, Slough, England

[22] Filed: Feb. 17, 1972

[21] Appl. No.: 227,136

[30] Foreign Application Priority Data
May 28, 1971  Great Britain .................... 17849/71

[52] U.S. Cl. ................................ 277/229, 277/234
[51] Int. Cl. .............................................. F16j 15/08
[58] Field of Search ........... 277/227, 229, 231, 232, 277/233, 234, 245, 235 B, 237; 220/46 MS; 123/193 HL; 92/168, 169, 170, 171

[56] References Cited
UNITED STATES PATENTS

| | | | |
|---|---|---|---|
| 1,715,356 | 6/1929 | Griffith | 277/229 |
| 1,789,595 | 1/1931 | Oven | 277/229 |
| 2,130,110 | 9/1938 | Victor et al. | 277/232 |
| 2,182,051 | 12/1939 | Kurth | 220/46 MS |

Primary Examiner—George E. Lowrance
Assistant Examiner—Robert I. Smith
Attorney, Agent, or Firm—Cushman, Darby & Cushman

[57] ABSTRACT

A sealing ring comprising a core consisting of a flat ring or a plurality of superposed flat rings and two corrugated rings disposed one at each end of the ring or superposed rings, the core being completely surrounded by a toroidal metal shell.

6 Claims, 3 Drawing Figures

PATENTED APR 23 1974                                  3,806,138

SEALING RING

This invention relates to a sealing ring, and in particular to a sealing ring suitable for sealing a cylinder bore in an internal combustion engine.

According to the invention, there is provided a sealing ring comprising a core consisting of an annular metal ring having in cross-section opposed substantially parallel faces extending radially of the ring, and two corrugated rings disposed one at each end of said ring; and a toroidal metal shell completely surrounding the core.

The cross-section of the second member can be of any curved shape provided it will resiliently compress or flatten when opposed axially directed forces are applied to the ring. Preferably the second member has a corrugated cross-section.

An embodiment of the invention will now be described by way of example only with reference to the accompanying drawings, in which.

Figure 1:
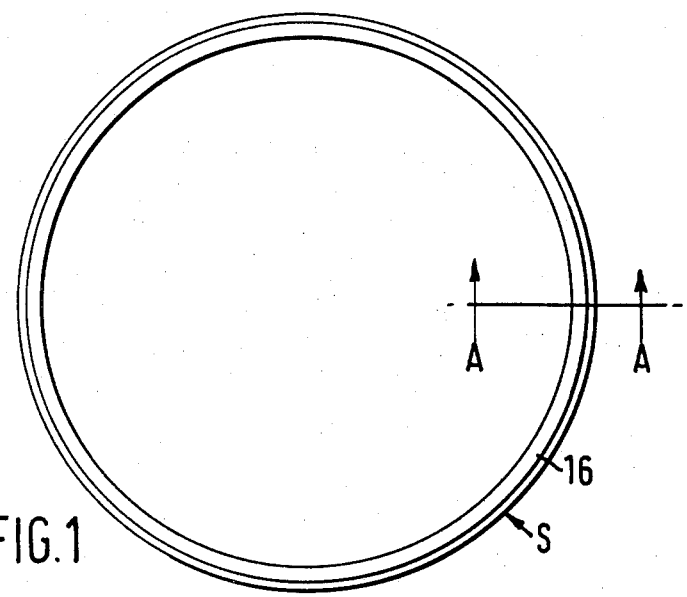
FIG. 1 is a plan view of a sealing ring axcording to the invention.
Figure 2:
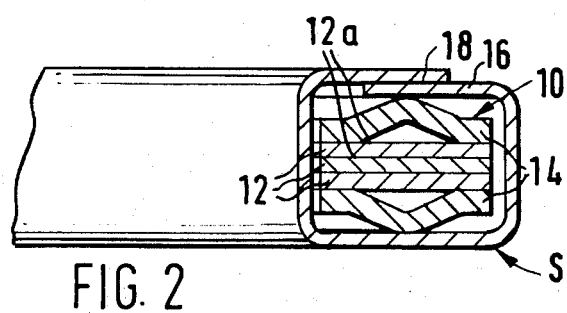
FIG. 2 is a section along the line A—A of FIG. 1.

Referring to the drawings, the sealing ring S comprises a core 10 including first and second superimposed annular metal members 12 and 14 respectively. The second members being of curved cross-section and engaging adjacent ones of said first members, and completely surrounding the core is a toroidal metal shell 16. As shown in the preferred embodiment, each second member has a corrugated cross-section consisting of a single corrugation, and three first members are provided; each first member has in cross-section opposed substantially parallel faces 12 extending radially of the ring.

The first and second members and the shell are in the present embodiment of steel such as tinplate or stainless steel; other high temperature resisting materials may also be employed.

During assembly of the ring, the shell is formed by wrapping sheet metal around the assembled core and overlapping the sheet metal at 18 without securing the overlapped portions to provide a closed figure in cross-section so as to completely surround the core, the second members engaging opposite sides of the sheet at the peaks of the corrugations with little if any force.

Figure 3:
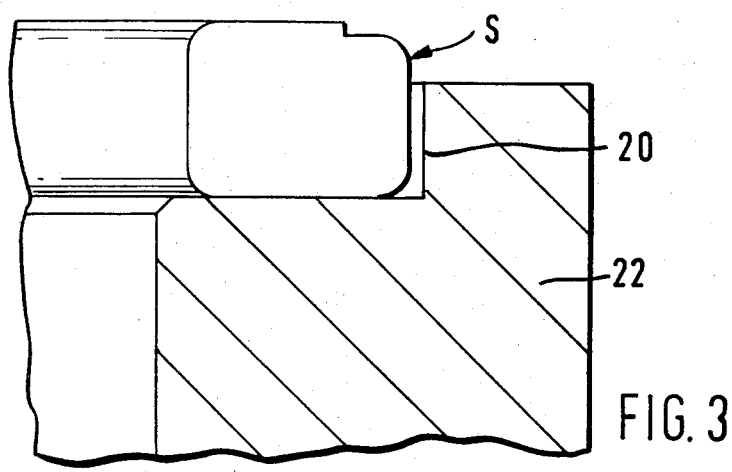
FIG. 3 shows the seal in position on a cylinder liner of an internal combustion engine.

The above described sealing ring has particular application to sealing the cylinder bore of an internal combustion engine, and FIG. 3 shows the ring located in an annular groove 20 formed in a cylinder liner 22.

The above described ring has good mechanical strength and heat dispersion properties and in addition is capable of satisfactorily accommodating small thermal differentials and vibration conditions that occur during the running of an internal combustion engine.

I claim:

1. A sealing ring comprising:
   a core consisting of two annuli, each having a circumferentially extending deformation defining a projection from the plane of the respective annulus, said projections being generally oppositely axially directed with respect to the sealing ring; and
   at least another annulus of substantially flat cross-section disposed axially intermediate said two annuli; and
   a toroidal metal shell completely surrounding said core.

2. A sealing ring according to claim 1, wherein the shell is of generally rectangular cross-section.

3. A sealing ring according to claim 1, wherein the shell is constituted by a piece of sheet metal circuiting the core at least slightly more than once to provide a closed figure overlapped in cross-section.

4. A sealing ring according to claim 1 wherein the cross-section of each deformation has a V-shape.

5. A sealing ring according to claim 1, wherein a plurality of said other substantially flat annulus is provided in coaxially superposed relationship.

6. A sealing ring according to claim 3 wherein the sheet metal of the shell circuits the core in a clockwise direction from underlap to overlap as seen in right hand radial crosssection, the outer layer at the overlap proceeding away from the inner radial extent of the ring.

* * * * *